Jan. 13, 1970  E. A. SANTOS  3,489,387
APPARATUS FOR SHAPING OF CORRUGATED BUILDING ELEMENTS
Filed Feb. 14, 1967
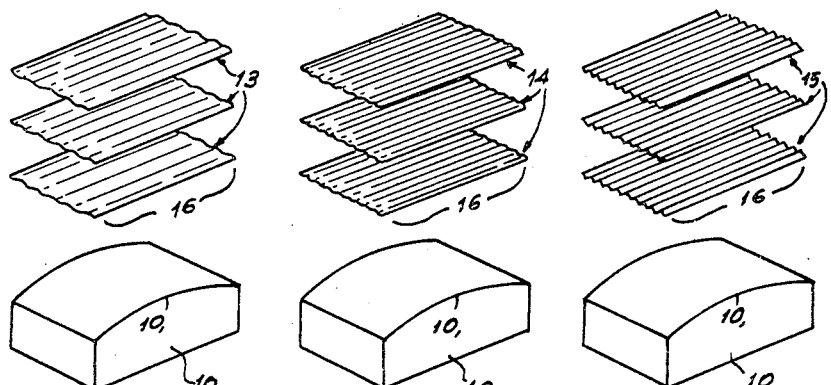
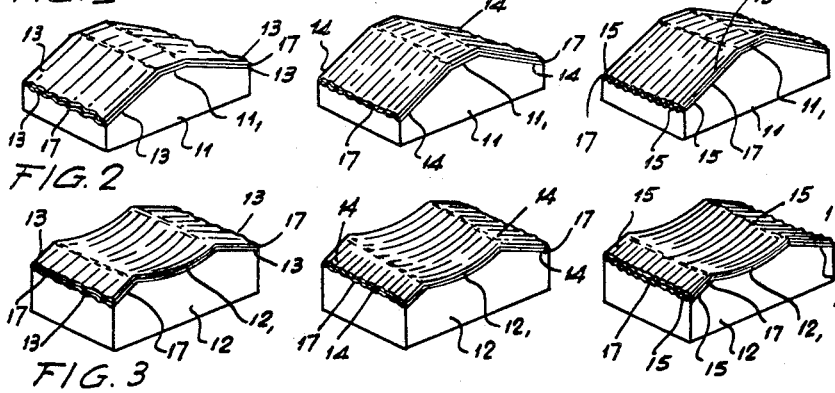
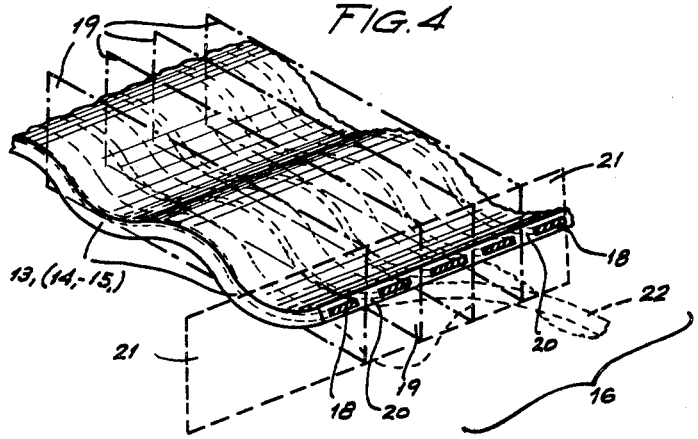
INVENTOR
EMILIO ARNO SANTOS
BY Young + Thompson
ATTORNEYS

United States Patent Office 3,489,387
Patented Jan. 13, 1970

3,489,387
APPARATUS FOR SHAPING OF CORRUGATED BUILDING ELEMENTS
Emilio Arno Santos, Avenida Republica Argentina 189, Barcelona, Spain
Filed Feb. 14, 1967, Ser. No. 616,106
Claims priority, application Spain, Feb. 14, 1966, 323,061
Int. Cl. B21d 5/01, 7/10; E04c 2/32
U.S. Cl. 249—189    3 Claims

ABSTRACT OF THE DISCLOSURE

Corrugated sheets of building material are formed with a contour that resists bending in the direction opposite that which is resisted by their corrugations, by molding them between corrugated sheets that have flexibility in the direction opposite to the direction in which corrugated sheets are ordinarily flexible. This special flexibility is imparted to the corrugated molding sheets by incorporating sinuous rigid inserts therein that extend parallel to each other and generally perpendicular to the corrugations. The sheets to be molded are stacked between the specially flexible molding sheets, and the stack is shaped by supporting it on a surface that has the overall shape, but not the corrugations, of the finally molded sheet.

---

This invention relates to the final shaping of corrugated building elements.

The present invention is apparatus for shaping corrugated building elements comprising a single supporting element suitably formed for shaping the transverse profile of successive, longitudinal corrugations of a series of nesting or stacking spacing elements co-acting with the aforesaid supporting element in performing a number of different fabricating operations, said spacing elements having rigid, permanent corrugations extending in one direction but being flexible in the direction transversely thereto, such that, with the single supporting element the upper surface whereof is suitably shaped parallel to the plurality of shaped surfaces containing the axes or centrelines of the successive corrugations of the series of corrugated elements intended to be nested or stacked thereon in a particular case, by placing on the said supporting element a first spacing element adapting itself by its own weight and flexibility to the aforesaid, shaped top surface of the said supporting element while the rigid corrugations of the said first spacing element remain unaffected; and followed by a first building element to be finally shaped with directly thereon another spacing element rigidly corrugated in the one direction and flexible in the direction transversely thereto, and this in succession, further building elements and spacing elements in appropriate alternation, these are stacked for moulding the said building elements which, in due course after having hardened or set sufficiently, will possess the characteristics common to any series of spacing elements and additionally the specific transverse conformation of its corrugations corresponding to the shape of the top surface of the aforesaid supporting element used in the particular case.

Any one of such supporting elements with its top surface shaped to match a particular fabricating requirement can be used in conjunction with different sets of spacing elements rigid in one direction and flexible in the direction transverse thereto, in such manner that the individual elements of each such set of separating elements are reciprocally identical and can thus be stacked or piled with others belonging to the same set, having regard to the characteristic shape or profile thereof in the direction in which they are rigid and without regard to any difference in the shape of the corrugations in that direction, between any one set and any other set, and can be used together with any different, lower supporting piece.

It is likewise provided that each such separating element for use in conjunction with a lower supporting element for fabricating building elements of any particular shape, shall be formed of a number of longitudinal members arranged side by side in such manner that their axes or centrelines are located, when the said longitudinal members are laid flat in the direction in which the element is flexible, in multiple, parallel and vertical planes, so that each of these being corrugated in shape within its corresponding plane, the successive, rigid longitudinal elements of the same plate or panel being held together by suitable joining means which are flexible in a plane at right angles to the vertical planes of the longitudinal members.

According to the final shape of the building element to be made, the aforesaid corrugations thereof and consequently the rigid corrugations of the spacing elements which impart the required profile in the same direction, may run in curved straight or broken lines or any combinations thereof, while maintaining as a whole the general shape which is commonly called "corrugated."

Embodiments of the present invention will now be described, by way of example, with reference to the accompanying drawings, in which:

FIGS. 1, 2 and 3 show diagrammatically the present invention applied to three different types of lower supporting elements which are transversely shaped to fit a particular set or series of nesting or stacking plates or panels in the direction in which the latter are flexible; there being shown different series of spacing or shaping elements with different forms of corrugations in each set, for making correspondingly-shaped building elements, not only appropriately curved transversely, but also having different forms of longitudinal corrugations; and FIG. 4 shows diagrammatically part of a spacing and shaping element, possessing the aforesaid characteristics, intended for use in accordance with the present invention.

As is shown in the drawings, the assembly in each case includes a single supporting and shaping element 10–11–12, suitable for shaping a transverse profile $10_1$, $11_1$, $12_1$ to successive parallel corrugations corresponding to any set 13, 14 or 15 of similar stacking or nesting spacing elements co-acting with the aforesaid supporting and shaping element(s) 10–11–12; the latter spacing elements 13–14–15 being suitable for use in numerous ways for the fabrication of building elements with the particular characteristic feature that the shaping elements have permanent, i.e. rigid, corrugations $13_1$–$14_1$–$15_1$, extending in one direction, but are flexible in the direction 16 transversely thereto. With a single supporting element 10, 11 or 12, having a suitably shaped upper surface, it is possible by the use of the plates 13, 14 or 15, to fabricate a plurality of profiled elements incorporating as will presently be seen, the axes or centrelines of the successive corrugations of such a set of nesting or stacking building elements as may be required in a particular case. For this purpose, there is placed on a corresponding supporting element 10 (11 or 12) a first spacing and shaping element 13 (14 or 15), which adapts itself by its own weight and transverse flexibility in the direction 16, to the upper shaped surface of the supporting element 10 (11 or 12), leaving unaltered the rigid (permanent) corrugations of the spacing element 13 (14 or 15); on which is placed a first building element 17, in readiness for receiving its final shape, followed by another spacing element 13 (14 or 15) with rigid corrugations extending in one direction but flexible in the transverse direction; and followed successively by further building elements 17 and further spacing element 13 (14 or 15), suitably alternating. All these are stacked or nested, for the manufacture of corresponding building elements 17 which together, when sufficiently set or hardened, possess identical corrugations corresponding to a particular set of spacing elements and also have the specific profile in the direction 16 transversely to the aforesaid corrugations, corresponding to the particular shaped surface $10_1$ ($11_1$ or $12_1$) of the supporting element 10 (11 or 12) used in this case.

Each spacing element 10 (11 or 12) the upper surface of which is shaped according to some one of the different products to be fabricated, can be used in conjunction with different sets of spacing elements 13–14–15 or the like, provided that all the elements of each series or set of such spacing elements are identical and can be stacked or nested with the other elements of the same set, at least in regard to the characteristic form and dimensions in the direction in which the said elements are rigid, while the corrugations may differ in the same direction of rigidity, between one set and any other, for the purpose of fabricating such building elements with larger or smaller corrugations.

Each of these spacing elements 13, 14 or 15, used in conjunction with the others of the same set or series as well as with a supporting element 10, 11 or 12, to be used in the fabrication of a particular product, suitably comprises (FIG. 4) a substantially flat, thin-walled part in the form of a sheet or panel, incorporating a number of rigid frame members 18 arranged side by side such that the respective axes thereof are located when the elements are extended flat in the direction in which they are flexible, in a number of parallel vertical planes 19, each such frame element being corrugated in its corresponding plane 19, the successive, rigid and corrugated elements of the same panel being interconnected by joining means 20 which are flexible in planes 21 at right angles to the vertical planes 19 in which the frame elements are located, the sheet or panel as a whole being flexible so as to occupy a position such as indicated by the broken lines 22, so that owing to the flexibility of the said joining means 20, it can adapt itself to the transverse profile 16 of the supporting element 10, 11 or 12 used in the particular case.

Although the drawings show the rigid corrugations of the spacing elements to be of substantially sinusoidal cross-section, it is to be understood that the said rigid corrugations can be of any curved, rectangular, broken or any other combination thereof, cross-section, giving in conjunction an appearance such as is commonly called "corrugated."

From the foregoing description it will be clear that by using only one supporting element 10, 11 or 12 and one set of identically-shaped elements 12, 13 or 14, building elements 17 can be moulded which, when sufficiently set or hardened, will, on the one hand, have rigid corrugations of the shape determined by the corrugations of the set of spacing or shaping elements used on the particular case, and in the direction transversely to these, the profile or cross-section shape $10_1$, $11_1$ or $12_1$ of the supporting element 10, 11 or 12, also used in that case. However, it is also evident that by changing the supporting element, the same corrugations are retained and the transverse configuration or curvature of the fabricated elements 17 varied, without affecting the corrugations and without using other sets of shaping or spacing plates. These features are of particular importance in the prefabrication of panels or fibrous cement or synthetic plastic for sheathing walls used in building construction since it is far more convenient to obtain such sheathing panels already with different radii or curvature or shapes at a minimum cost of fabrication.

Some of the advantages of apparatus as hereinbefore described are as follows:

(1) It becomes possible to manufacture corrugated elements for building construction which, instead of being flat or of plane form and of one fixed shape, can be shaped to any particular form desired, for example, with a transversely varying, cross-sectional profile imparting a predetermined degree of curvature to the said profile without, for this purpose, having to use a corresponding set of suitably shaped, intermediate spacing or separating formers. At the present time, it is necessary to hold a varied stock of such spacing elements consisting of as many different sets as there are series of different curvatures to be imparted to the corrugated building elements to be produced.

(2) As a consequence of (1) above, these improvements will require a smaller investment of financial means for the fabrication of any particular range of finally-shaped corrugated building elements.

(3) Correspondingly, the unit cost of such building elements will be reduced.

(4) A problem is likewise eliminated which may arise in some production plants, viz. a lack of space for storing the many sets of spacing elements corresponding to the various ranges of building elements to be made; and in any case, transportation (handling) costs are saved; since, with a single bottom supporting element adaptable to any particular requirement, and a set of spacing elements adaptable to fit the said supporting element, a wide range of such building elements can be suitably fabricated. Merely by changing one element in each case, acting as the support, using different supporting elements with the same set of spacing elements, the changes to be made, and the transportation (handling) costs involved to make a complete range of different fabricated shapes, can be appreciably reduced.

What we claim is:

1. Apparatus for shaping corrugated building elements, comprising a sheet corrugated on both sides and each of whose corrugations extends substantially from end to end of the sheet and is of uniform cross-sectional configuration substantially from end to end of the sheet so that at least three of the sheets are stackable in nested relation with building elements therebetween, the sheet having greater flexibility in a plane perpendicular to the sheet and parallel to the lengthwise extent of the corrugations than in a plane perpendicular to the sheet and perpendicular to the lengthwise extent of the corrugations, said sheet comprising a sheet of flexible material having parallel rigid inserts embedded therein that are disposed perpendicular to the lengthwise extent of said corrugations and that follow the contours of said corrugations.

2. Apparatus as claimed in claim 1, said inserts being spaced apart from each other by the material of said sheet.

3. Apparatus as claimed in claim 1, there being a plurality of said sheets in a stack, and a support having an upper surface on which said stack rests, said upper surface being nonplanar and defined by straight lines parallel to each other and perpendicular to the lengthwise extent of said corrugations.

References Cited

UNITED STATES PATENTS

| | | | |
|---|---|---|---|
| 1,126,611 | 1/1915 | Wright | 108—67 |
| 1,189,140 | 6/1916 | Lane | 161—133 |
| 1,433,864 | 10/1922 | Williams | 52—630 |
| 2,004,935 | 6/1935 | Dorn et al. | 161—135 |
| 2,881,718 | 4/1959 | Stromeyer | 52—18 |
| 3,068,753 | 12/1962 | Kirkpatrick | 52—80 |
| 3,074,116 | 1/1963 | Green | 52—80 |
| 3,200,026 | 8/1965 | Brown | 52—80 |
| 3,247,891 | 4/1966 | Sadoff | 160—229 |
| 3,289,360 | 12/1966 | Gartner | 52—18 |
| 1,289,083 | 12/1918 | Banks | 249—189 |
| 1,511,955 | 10/1924 | Fisher. | |
| 2,971,237 | 2/1961 | Graham | 249—33 |
| 3,071,180 | 1/1963 | Finger et al. | 264—286 |

FRANCIS K. ZUGEL, Primary Examiner

U.S. Cl. X.R.

52—749; 264—286